United States Patent [19]

Godwin, Jr.

[11] Patent Number: 4,557,066
[45] Date of Patent: Dec. 10, 1985

[54] ANIMAL TRAP
[76] Inventor: Oliver W. Godwin, Jr., 205 Lakeshore Dr., Dunn, N.C. 28334
[21] Appl. No.: 612,259
[22] Filed: May 21, 1984
[51] Int. Cl.$^4$ .......................................... A01M 23/02
[52] U.S. Cl. ..................................................... 43/60
[58] Field of Search ............................... 43/58, 60, 61
[56] References Cited

U.S. PATENT DOCUMENTS

| | | | |
|---|---|---|---|
| 1,382,425 | 6/1921 | Kass | 43/58 |
| 2,434,031 | 1/1948 | Adams | 43/61 |
| 3,733,735 | 5/1973 | Hirsch | 43/61 |
| 4,142,320 | 3/1979 | Marcolina | 43/61 |
| 4,144,667 | 3/1979 | Souza | 43/61 |
| 4,231,180 | 11/1980 | Bare | 43/61 |
| 4,238,902 | 12/1980 | Holl | 43/61 |
| 4,291,486 | 9/1981 | Lindley | 43/61 |

FOREIGN PATENT DOCUMENTS 1200131  9/1965  Fed. Rep. of Germany .......... 43/95

Primary Examiner—Gene P. Crosby
Attorney, Agent, or Firm—Mills and Coats

[57] ABSTRACT

A trapping device is disclosed for animals such as rats, mice and other types of animals. One particular design disclosed herein entails a tomb type trap especially designed for rats and mice which is disposable and of a simple and inexpensive monolithic or integral construction. This trap includes a spring loaded conical door that is actuated by the animal itself to move to a closed position and which effectively seals the disposable trap and causes the rats, mice or other animals to suffocate. Once the animal is trapped within the tomb type trap, the same may be discarded.

10 Claims, 4 Drawing Figures

ANIMAL TRAP

FIELD OF INVENTION

The present invention relates to animal traps, and more particularly to rat and mouse traps of a disposable design which are relatively simple and inexpensive in design.

BACKGROUND OF INVENTION

One of the most dreaded chores is that of removing a rat or a mouse from a trap and resetting the same. This is especially an undesirable chore in cases where the rat or mouse has been dead for some time and there is an odor associated with the same.

Further, from a review of the prior art with respect to rat and mouse traps and animal traps in general, one finds that there is a substantial volume of art with respect to animal traps in general. A review of such art shows that a great deal of the art in this area involves traps that are very complicated and expensive, and sometimes even sophisticated. Moreover, such traps are not always dependable and reliable.

Therefore, there has been and continues to be a need for a simple and reliable animal trap which can be produced relatively inexpensively.

SUMMARY OF THE INVENTION

The present invention presents an animal trap that is relatively simple in design and which can be manufactured and sold at a relatively inexpensive price.

In accordance with this, the present invention presents a trap which is specifically designed for rats, mice and the like. In this design, the trap is a disposable trap and designed upon actuation to actually suffocate the rat, mouse or the like therein. After which, the entire trap, with the enclosed animal, can be disposed of.

The same basic trap design can be used to trap other larger animals in the same way, except in these case, the trapping enclosure would be vented in order that the animal would be maintained alive after trapping.

It is therefore a principal object of the present invention to provide an animal trap that stresses simplicity in design and which can be easily manufactured.

Another object of the present invention is to provide a simple animal trap design that is compatible with a wide range of animals and which will effectively trap many types of animals, irrespective of size.

Another object of the present invention is to provide an animal trap of the character referred to above that is of an integral design and which has a minimum number of moving parts, none of which are injurious in any way to any one even a child.

Still a further object of the present invention is to provide a disposable rat or mouse trap that entombs and suffocates the trapped rat or mouse permanently, after which the entire trap with the rat or mouse therein may be discarded.

A further object of the present invention resides in the provision of a relatively simple animal trap that includes a conically shaped door that moves back and forth with respect to an access opening and in which case the door is spring loaded to move to a closed position with respect to the access opening and wherein the door is positioned and retained within the trapped structure such that the entry of the animal itself will upset the basically conically shaped door and cause the same to be appropriately released after which the door moves into closed engagement with the access opening, trapping the animal in the process.

Other objects and advantages of the present invention will become apparent from a study of the following description and the accompanying drawings which are merely illustrative of such invention.

Figure 1:
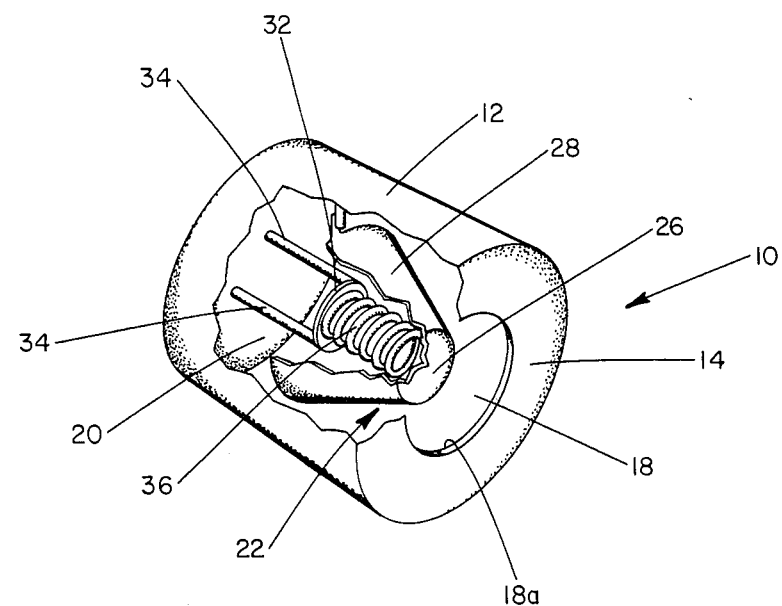
FIG. 1 is a perspective view of the animal trap of the present invention with portions of the outer structure of the trap broken away to better illustrate internal structure thereof.

With further reference to the drawings, the animal trap of the present invention is shown therein an indicated generally by the numeral 10.

Viewing the animal trap in detail, it is seen that the same includes a trapping structure including a cylindrical wall 12 having a front panel 14 and a back 16. Although the structure of the animal trap 10 of the present invention may vary, it is contemplated that in a case where the same is designed to trap rats and mice that the trap could be formed from molded plastic or the like.

Formed in front panel 14 is a circular access opening 18 that includes a center and a perimeter border 18a.

Therefore as seen from the drawings, trapping structure 10 defines an enclosed area referred to by the numeral 20.

Movably mounted within trapping structure 10 is a basically conical shaped hollow door 22 that as illustrated in the drawings includes a longitudinal axis 38. The basically conical shaped door is particularly disposed within trapping structure 10 to move horizontally fore and aftly therein. It is seen that conical door 22 includes a base 24 that faces back 16 and a remote end 26 that is disposed adjacent to and faces access opening 18. In addition, door 22 includes a generally conical shaped surrounding wall structure 28. As seen in the drawings, due to the fact that door 22 assumes a generally conical shape, that the cross-sectional area thereof progressively decreases from the hollow backside 24 toward remote end 26. As will be appreciated from subsequent portions of this disclosure, this facilitates the closing of access opening 18 when the trap is actuated.

Secured within the interior compartment 20 of trap 10 is a spring seat 32 that supported by a pair of support members 34 that extend between the spring seat and back 16 of the trapping structure 10. Interconnected between spring seat 32 and the remote end of conical shaped door 22 is a coil spring 36. Coil spring 36 normally biases conical door 22 toward a closed position in which case the same would project through access opening 18 and effectively close the same.

Figures 2, 3:
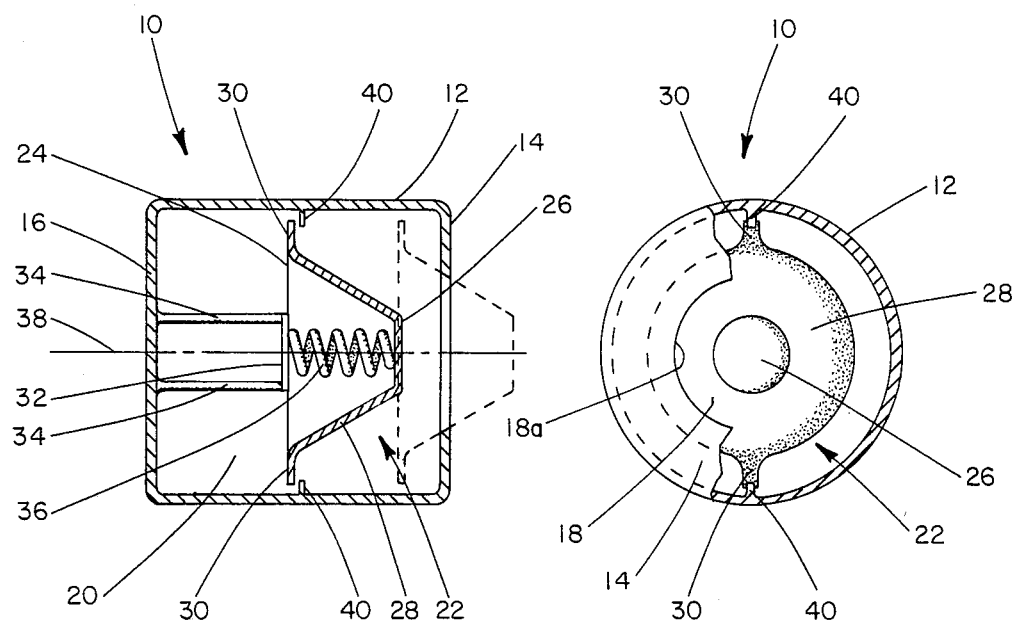
FIG. 2 is a side elevational view of the animal trap of the present invention shown in section.
FIG. 3 is a front elevational view of the animal trap of the present invention with a portion of the front broken away to better illustrate internal str!ucture of the trap.

Conical shaped door 22 normally assumes an open position as shown in full lines in FIG. 3. This open position is achieved by providing a projecting means for ears 30 that project outwardly from the base of conical door 22. To retain and hold conical door 22 in the open position, there is provided a pair of retainers 40 that project inwardly from the inside of cylindrical wall 12. These retainers 40 are particularly spaced so as to align with projecting means or ears 30 that project outwardly from conical door 22. Consequently, when appropriately aligned and positioned retainers 40 engage projecting means or ears 30 so as to hold and retain conical door 22 in an open position. Also this structure provides a means of resetting the trap should the same become ajar while transporting by pressing on end 26 to reset the same under retainers 40.

As seen in the drawings, the base 24 of conical door 22 extends into close proximity to the inside wall of cylindrical wall 12 and as such effectively lies in the path of the entering animal that may be directed to the rear area of the trap to seek out bait. Therefore, as the animal, such as the rat moves from the access opening 18 toward back 16, it is clear that the animal will engage the conical door 22 and will disrupt the retaining relationship of retainers 40 and ears 30. Effectively, the animal will cause the ears to move to one side of the retainers 40 which will effectively disengage the retainers and due to the influence of spring 36, the conical door 22 will be forced to move toward and through access opening 18. Once conical door 22 moves through access opening 18 it is seen that this effectively closes access opening 18 and the animal, such as a rat or mouse, is trapped therein.

In one embodiment or design of the present invention, the trapping structure 10 of the present invention is especially designed to be a disposable trap for rats, mice and the like. In such a design the entire wall structure of the trapping structure would be imperforated. Thus, the closing of access opening 18 by conical door 22, creates an airtight seal which effectively suffocates the rat, mouse or the like therein. Thereafter, the entire trapping structure can be disgarded.

It is envisioned that in the case of a small type of trapping structure that is designed for rats, mice and the like that the entire trapping structure would be of a integral design in which case the spring 36 would be integrally formed with conical door 22 as well as spring seat 32. This means that the entire trapping structure could be formed by a single plastic molding process.

As discussed and suggested hereinabove, animal trap 10 of the present invention can be utilized to trap a wide range of animals of various sizes. The same basic design as set forth in the drawings herein and as discussed hereinabove could be used. In a design for large animals, it is contemplated that the wall structure of the trap 10 would be vented so as not to suffocate the animal upon trapping.

Figure 4:
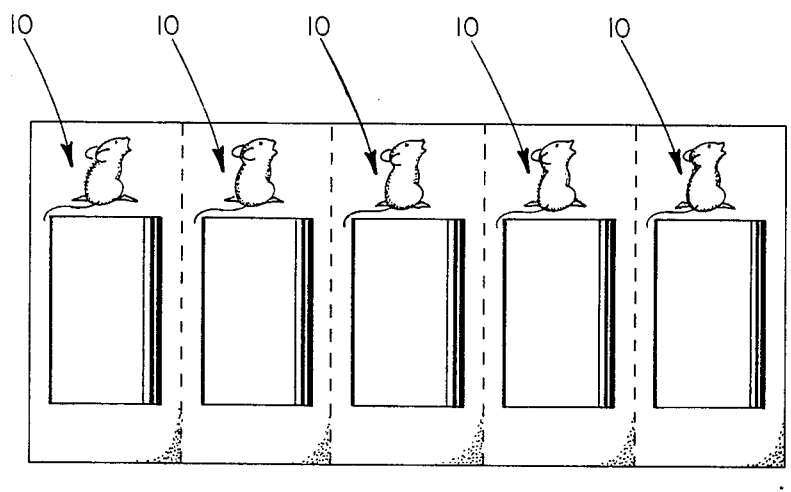
FIG. 4 illustrates a series of the animal traps of the present invention being secured to a perforated board designed for merchandising, dissemination and disposability.

In the case of a small trapping device, such as for rats, mice and the like, it is contemplated that a plurality of trapping devices could be attached to or molded onto a display board for merchandising purposes. This board, whether cardboard or plastic or the like, would have a series of perforated strips included thereon with a respective trap being bounded by a respective perforated strip. This would enable an individual to purchase an entire board of traps, and the individual could tear off the traps, one-by-one, from the board as needed. This is particularly illustrated in FIG. 4 of the drawings.

From the foregoing specification and discussion it is appreciated that the rat trap of the present invention has advantages over rat traps known in the art inasmuch as the same is designed for simplicity and ease of use. Of particular importance is the fact that the basic design disclosed herein can be used to trap a wide range of animals, animals of all sizes. In a case of the design for a rat trap or mouse trap or for very small animals or insects a trap is designed to be disposable and also to actually suffocate the animal in an airtight environment such that there is no odor ever emitted from the trap.

Furthermore, the animal trap of the present invention will prevent injuries from accidental releases during baiting as is common with currently available traps.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A disposable tomb type rat and mouse trap for trapping a rat or mouse and suffocating the same, comprising: a container structure including an imperforated wall structure having surrounding sides, a back, and a circular access opening formed therein, said container forming and defining an interior compartment therein; a conical shaped door having a major axis, a base, and a door closing end portion opposite said base, said conical door normally assuming an open position and disposed within the interior compartment of said container and in said open position said door closing end portion assumes a spaced apart relationship with said circular access opening so as to allow a rat or mouse to enter said container via said access opening; a bait area formed within said container between the back thereof and the base of said conical shaped door; a spring seat disposed within said tomb type container and laterally spaced from the base of said conical shaped door; spring means operatively connected between said spring seat and a bottom surface of said conical shaped door for spring biasing said conical shaped door toward said access opening; a pair of ears projecting outwardly from said conical shaped door; a pair of retainers extending inwardly from the wall structure of said container and projecting into the interior compartment of said container and normally engaging said pair of ears for restraining said conical shaped door and holding the same in said open position against the force of said spring; and wherein said conical shaped door is positioned within said container so as to lie in the path of a rat or mouse when the same moves from said access opening toward said bait area such that as the rat or mouse moves toward the bait area the rat or mouse will engage said conical shaped door and move the same such that said pair of ears projecting therefrom will no longer be restrained by said pair of retainers thereby causing said spring means to project said conical shaped door toward said access opening such that the door closing end portion of said conical shaped door projects through said access opening and closes the same so as to trap and contain, the rat or mouse within said container.

2. The tomb type rat trap of claim 1 wherein said container, conical shaped door, spring and spring seat are of a one piece integral design.

3. The tomb type rat trap of claim 2 wherein said container is of a generally cylindrical shape with opposed ends and wherein said access opening is formed about one end thereof.

4. The trap of claim 3 wherein said spring seat is spaced from said back and wherein there is provided a pair of support members that extend from said back to said spring seat for supporting the same, and wherein said spring is integrally constructed with both said spring seat and the bottom of said conical shaped door.

5. An animal trap comprising: an enclosure having an access opening through which an animal may enter; a door movably mounted within said enclosure and movable from an open position spaced from said access opening to a closed position to where said door effectively closes said access opening; said door including a base, a remote end normally disposed adjacent said access opening, and a variable cross-sectional area and wherein the cross-sectional area of said door progressively decreases from said base to said remote end; spring means operatively associated with said door for biasing the door and the remote end in the direction of said access opening; projecting means projecting outwardly from said door; retainer means operatively associated with said enclosure and projecting therefrom for engaging said projecting means and holding said door in said open position; and wherein said door is positioned within said enclosure such that the door will be engaged by an animal entering said access opening and moving through said enclosure and wherein said projecting means, retainer means, and door are so structured and positioned such that engagement with said door by said animal will result in said projecting means being disengaged from said retainer means and the door moving from said open position to said closed position under the influence of said spring means wherein the door will project through and fill said access openings so as to close said enclosure and entrap the animal therein.

6. The animal trap of claim 5 wherein said door comprises a conical shaped door having a side wall structure and a major axis and wherein said access opening is generally circular and includes a center and a perimeter that defines said access opening; and wherein said conical shaped door is movable horizontally fore and aftly with said major axis being aligned with the center of said access opening and in moving from said open position to said closed position the remote end of said conical shaped door moves through the center of said access opening until the side wall structure of said conical shaped door engages the perimeter of said access opening and fills the same.

7. The animal trap of claim 6 wherein said enclosure includes a back side opposite said access opening and wherein there is provided a spring seat spaced between said back side and said access opening and wherein said spring means is operatively interconnected between said spring seat and a bottom surface of said conical shaped door.

8. The animal trap of claim 7 wherein said enclosure, spring seat, spring means and conical shaped door are integrally constructed.

9. The animal trap of claim 8 wherein said enclosure is generally cylindrical in shape with said access opening being formed within a wall structure that forms an end of said cylindrical shaped enclosure, and wherein said retaining means includes a pair of tabs that project inwardly from the cylindrical wall structure of said enclosure.

10. A disposable tomb type rat and mouse trap, with a display board, for trapping a rat or mouse and suffocating the same, comprising: a container structure including an imperforated wall structure having surrounding sides, a back, and a circular access opening formed therein, said container forming and defining an interior compartment therein; a conical shaped door having a major axis, a base, a door closing end portion opposite said base, said conical door normally assuming an open position and disposed within the interior compartment of said container and in said open position said door closing end portion assumes a spaced apart relationship with said circular access opening so as to allow a rat or mouse to enter said container via said access opening; a bait area formed within said container between the back thereof and the base of said conical shaped door; a spring seat disposed within said tomb type container and laterally spaced from the base of said conical shaped door; spring means operatively connected between said spring seat and a bottom surface of said conical shaped door for spring biasing said conical shaped door toward said access opening; a pair of ears projecting outwardly from said conical shaped door; a pair of retainers extending inwardly from the wall structure of said container and projecting into the interior compartment of said container and normally engaging said pair of ears for restraining said conical shaped door and holding the same in said open position against the force of said spring; and wherein said conical shaped door is positioned within said container so as to lie in the path of a rat or mouse when the same moves from said access opening toward said bait area such that as the rat or mouse moves toward the bait area the rat or mouse will engage said conical shaped door and move the same such that said pair of ears projecting therefrom will no longer be restrained by said pair of retainers thereby causing said spring means to project said conical shaped door toward said access opening such that the door closing end portion of said conical shaped door projects through said access opening and closes the same so as to trap and contain, the rat or mouse within said container; and including a display board having a plurality of said tomb type rat traps secured therein and wherein said display board includes perforated sections with respective tomb type traps being secured on respective perforated sections such that the respective tomb type traps can be removed one-by-one from the display board by simply tearing along perforations.

* * * * *